(12) United States Patent
Vollert et al.

(10) Patent No.: US 11,713,030 B2
(45) Date of Patent: Aug. 1, 2023

(54) CONTROL DEVICE AND METHOD FOR OPERATING AN ELECTROMECHANICAL BRAKE BOOSTER OF A BRAKE SYSTEM OF A VEHICLE

(71) Applicant: Robert Bosch GmbH, Stuttgart (DE)

(72) Inventors: Herbert Vollert, Vaihingen/Enz (DE); Christian Binder, Mainhardt (DE); Manfred Gerdes, Vaihingen/Enz (DE); Oliver Fuchs, Ilsfeld (DE); Patrick Christian Schaefer, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 810 days.

(21) Appl. No.: 16/471,450

(22) PCT Filed: Nov. 30, 2017

(86) PCT No.: PCT/EP2017/080972
§ 371 (c)(1),
(2) Date: Jun. 19, 2019

(87) PCT Pub. No.: WO2018/121952
PCT Pub. Date: Jul. 5, 2018

(65) Prior Publication Data
US 2021/0129819 A1  May 6, 2021

(30) Foreign Application Priority Data
Dec. 29, 2016 (DE) .......................... 102016226325.0

(51) Int. Cl.
*B60T 7/12* (2006.01)
*B60T 13/74* (2006.01)
(Continued)

(52) U.S. Cl.
CPC .............. *B60T 13/745* (2013.01); *B60T 7/12* (2013.01); *B60T 8/17* (2013.01); *B60T 8/441* (2013.01); *H02P 15/00* (2013.01); *B60T 2201/02* (2013.01)

(58) Field of Classification Search
None
See application file for complete search history.

(56) References Cited

U.S. PATENT DOCUMENTS

| | | | |
|---|---|---|---|
| 6,345,869 B1 | 2/2002 | Matsuo et al. | |
| 2012/0109482 A1* | 5/2012 | Yoshii | B60T 8/4872 701/70 |

(Continued)

FOREIGN PATENT DOCUMENTS

| | | |
|---|---|---|
| CN | 102207145 A | 10/2011 |
| DE | 3819490 A1 | 12/1989 |

(Continued)

OTHER PUBLICATIONS

Machine Translation of WO2006125547 (Year: 2006).*

(Continued)

*Primary Examiner* — James M McPherson
(74) *Attorney, Agent, or Firm* — Norton Rose Fulbright US LLP; Gerard Messina

(57) ABSTRACT

A control apparatus/method for operating an electromechanical brake booster of a vehicle braking system, including: applying control to an electromechanical brake booster motor in consideration at least of a braking definition signal regarding a braking input of a driver and/or automatic speed control system of the vehicle (ACC); specifying, in consideration at least of the braking definition signal, a target motor force of the electromechanical brake booster motor or a target brake application force of the electromechanical brake booster into a brake master cylinder, downstream from the electromechanical brake booster, of the braking system; and applying control to the electromechanical brake booster motor in consideration of a force difference between the specified target motor force and an estimated/measured actual motor force of the motor, or between the specified target brake application force and an estimated/measured actual brake application force of the electromechanical brake booster into the downstream brake master cylinder.

8 Claims, 3 Drawing Sheets

(51) Int. Cl.
*B60T 8/17* (2006.01)
*B60T 8/44* (2006.01)
*H02P 15/00* (2006.01)

(56) References Cited

U.S. PATENT DOCUMENTS

| | | | | |
|---|---|---|---|---|
| 2014/0318910 A1* | 10/2014 | Kaestner | ............... | B60T 8/4872 |
| | | | | 188/355 |
| 2016/0152221 A1* | 6/2016 | Furuyama | ............. | B60T 8/4291 |
| | | | | 303/11 |
| 2016/0152232 A1* | 6/2016 | Takahashi | ............ | B62D 5/0463 |
| | | | | 701/41 |

FOREIGN PATENT DOCUMENTS

| | | | | |
|---|---|---|---|---|
| DE | 202010017605 U1 | 10/2012 | | |
| DE | 102013214212 A1 | 2/2014 | | |
| DE | 102014213913 A1 | 1/2016 | | |
| JP | 2014019344 | 2/2014 | | |
| WO | WO-2006125547 A1 * | 11/2006 | ............ | B60T 13/745 |
| WO | 2011154369 A1 | 12/2011 | | |
| WO | 2015185241 A1 | 12/2015 | | |
| WO | WO2015/188957 A1 * | 12/2015 | .............. | B60T 17/22 |

OTHER PUBLICATIONS

EPO Machine Translation of WO2015/188957A1 (Year: 2015).*
International Search Report for PCT/EP2017/080972, dated Mar. 23, 2018.

* cited by examiner

CONTROL DEVICE AND METHOD FOR OPERATING AN ELECTROMECHANICAL BRAKE BOOSTER OF A BRAKE SYSTEM OF A VEHICLE

FIELD OF THE INVENTION

The invention relates to a control apparatus for at least one electromechanical brake booster of a braking system of a vehicle. The invention also relates to an electromechanical brake booster for a braking system of a vehicle, and to a braking system for a vehicle. The invention furthermore relates to a method for operating an electromechanical brake booster of a braking system of a vehicle.

BACKGROUND INFORMATION

Electromechanical brake boosters that are respectively placeable or placed upstream from a brake master cylinder of a braking system of a vehicle, for example an electromechanical brake booster discussed in DE 20 2010 017605 U1, are from the related art. The intention is that by operation of a motor of the respective electromechanical brake booster, at least one displaceable piston of the brake master cylinder is to be displaceable into the brake master cylinder in such a way that a brake master cylinder pressure in the brake master cylinder is increased.

SUMMARY OF THE INVENTION

The present invention creates: a control apparatus for at least one electromechanical brake booster of a braking system of a vehicle, having the features described herein; an electromechanical brake booster for a braking system of a vehicle, having the features described herein; a braking system for a vehicle, having the features described herein; and a method for operating an electromechanical brake booster of a braking system of a vehicle, having the features described herein.

By controlling an electromechanical brake booster in consideration of a force difference between a specified target motor force of a motor of the electromechanical brake booster and an estimated or measured actual motor force of the motor of the electromechanical brake booster (or between a specified target brake application force of the electromechanical brake booster into a downstream brake master cylinder and an estimated or measured actual braking application force of the electromechanical brake booster into the brake master cylinder), the present invention makes possible control of the respective electromechanical brake booster with "indirect co-consideration" of a load that the electromechanical brake booster feels while being used in the respective braking system equipped therewith. The present invention utilizes for that purpose the fact that the actual motor force of the motor of the electromechanical brake booster (or the actual brake application force of the electromechanical brake booster into the downstream brake master cylinder) is dependent on a present load.

The present invention also creates advantageous possibilities for using the electromechanical brake booster to increase a pressure in the downstream brake master cylinder (and in at least one wheel brake cylinder connected to the brake master cylinder), the electromechanical brake booster simultaneously being usable as a "sensor system" for ascertaining the load or change in load working against the electromechanical brake booster. When a load or change in load is recognized by way of the present invention it is then furthermore possible, by operating the electromechanical brake booster in accordance with the present invention, to prevent an excessive rotation speed of the motor of the electromechanical brake booster from resulting in occurrence of an undesirably high pressure or pressure peaks in the brake master cylinder. Utilization of the present invention in a braking system correspondingly ensures that no undesired pressure or pressure peaks occur in another braking system component connected to the respective brake master cylinder. The present invention thus contributes to a reduction in the risk of damage to braking system components of the braking system respectively being used. The present invention also contributes to an avoidance of mechanical stresses on the electromechanical brake booster, with the result that a service life of the electromechanical brake booster can be increased.

For example, by way of the use according to the present invention of the electromechanical brake booster as a "sensor system," a situation in which a hydraulic stiffness of the respective braking system is increasing, as occurs e.g. upon a closure of wheel inlet valves of the respective braking system during an antilock regulation operation (ABS or EPS regulating operation), can be quickly recognized. While transfer of a signal to a conventional electronic control system of the electromechanical brake booster regarding the closure of the wheel inlet valves as a rule requires at least 30 milliseconds (ms), by way of the present invention the change in load can be recognized much more quickly and reacted to correspondingly more promptly. In particular during an antilock regulation operation, a comparatively large amount of brake fluid is pumped in the brake master cylinder by way of at least one pump or return delivery pump of the braking system. A closure of wheel inlet valves of the respective braking system additionally occurs. By way of the present invention, however, thanks to the use of the electromechanical brake booster as a "sensor system," it is possible to react quickly to a possibly existing risk of an undesirably high pressure in the brake master cylinder. The present invention thus also contributes to reducing a risk of damage during antilock regulation. The conventional disadvantage of the electromechanical brake booster, i.e. that as a rule it does not react elastically and, because of its high gearing ratio and high gearing friction, exhibits a high holding capability, can thus be eliminated. Damage to the braking system is thus not a risk even after multiple execution of antilock regulation operations. Equipping the braking system with the control apparatus described hereinafter thus easily pays for itself by way of reduced repair costs.

In an advantageous embodiment of the control apparatus, the electronic device is configured to specify a target rotation speed of the motor of the electromechanical brake booster in consideration of the force difference, and to output the at least one control signal to the motor of the electromechanical brake booster in consideration of the specified target rotation speed. An operating mode of the electromechanical brake booster which is controlled by defining the target rotation speed is thus reliably adaptable to a change in load occurring in the respective braking system.

The electronic device may be configured to specify the target rotation speed of the motor of the electromechanical brake booster, in consideration of the force difference, in such a way that an absolute value of the specified target rotation speed is always greater than or equal to a defined minimum absolute rotation speed value not equal to zero. This embodiment of the control apparatus thus takes into account the fact that a concrete estimate of the load or of the change in load can be made as a rule only when the motor of the electromechanical brake booster is rotating. An application of control to the electromechanical brake booster by defining the absolute value of the target rotation speed as at least the defined minimum absolute rotation speed value therefore permits uninterrupted utilization of the electromechanical brake booster as a "sensor system."

For example, the electronic device can be used to specify the absolute value of the target rotation speed to be equal to the defined minimum absolute rotation speed value if an absolute value of the force difference is less than a defined comparison value not equal to zero, and to specify the absolute value of the target rotation speed as a function of the speed difference if the absolute value of the force difference is greater than the defined comparison value. The electronic device can thus be embodied comparatively economically and with a relatively small installation space requirement.

In a further advantageous embodiment of the control apparatus, the electronic device is configured to estimate the actual motor force of the motor of the electromechanical brake booster, or the actual braking application force of the electromechanical brake booster into the downstream brake master cylinder, in consideration at least of a present current intensity of a motor current of the motor of the electromechanical brake booster and of a present rotation angle of a rotor of the motor of the electromechanical brake booster. As explained in more detail below, this embodiment of the control apparatus allows a reliable estimate of the actual brake application force with "indirect co-consideration" of a present load and/or of a present change in load.

The advantages described above are also ensured in the context of an electromechanical brake booster for a braking system of a vehicle having such a control apparatus.

A braking system for a vehicle, having a corresponding control apparatus, having the electromechanical brake booster controllable by way of the least one control signal of the control apparatus, and having the brake master cylinder that is downstream from the electromechanical brake booster, also achieves the advantages described above.

Execution of a corresponding method for operating an electromechanical brake booster of a braking system of a vehicle also creates the advantages described above. It is noted expressly that the method for operating an electromechanical brake booster of a braking system of a vehicle can be refined in accordance with the above-described embodiments of the control apparatus.

Further features and advantages of the present invention will be described below with reference to the Figures.

DETAILED DESCRIPTION

Figure 1A:
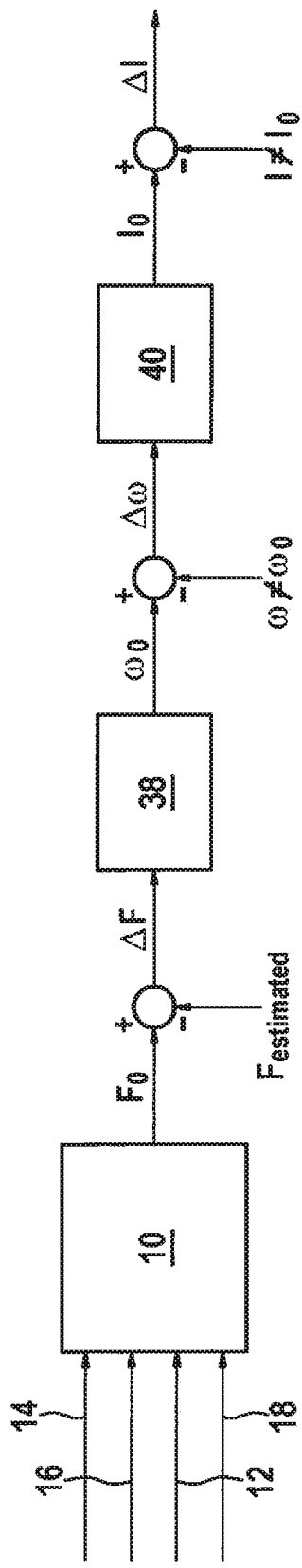
FIGS. 1a, 1b, 1c, and 1d show flow charts and a coordinate system to explain an embodiment of the method for operating an electromechanical brake booster of a braking system of a vehicle.

FIGS. 1a to 1d show flow charts and a coordinate system to explain a first embodiment of the method for operating an electromechanical brake booster of a braking system of a vehicle.

An implementability of the method described hereinafter is not limited either to a specific braking system type of the braking system equipped with the electromechanical brake booster or to a specific vehicle or motor vehicle type of the vehicle or motor vehicle fitted with the braking system. The "electromechanical brake booster" is understood as a brake booster equipped with an (electric) motor. The electromechanical brake booster is furthermore located upstream from a brake master cylinder of the braking system in such a way that by operation of the motor of the electromechanical brake booster, at least one displaceable piston of the brake master cylinder is displaceable or becomes displaced into the brake master cylinder.

In the method described hereinafter, in a method step depicted schematically in FIG. 1a by way of a block 10 a target brake application force $F_0$ of the electromechanical brake booster into the brake master cylinder downstream from it is specified. (Alternatively, a target motor force of the motor of the electromechanical brake booster can also be specified.) The target brake application force $F_0$ (or the target motor force) of the electromechanical brake booster into the brake master cylinder is specified in consideration at least of a braking definition signal 12 with regard to a braking input of a driver of the vehicle and/or of an automatic speed control system of the vehicle (e.g. an automatic cruise control system). For example, the driver of the vehicle can define a target vehicle deceleration by actuation of its brake actuation element or brake pedal, which triggers a specification of the target brake application force $F_0$ (or of the target motor force) for power assistance to the driver by way of the electromechanical brake booster in bringing about the target vehicle deceleration. (In this case, braking definition signal 12 is a signal of a sensor disposed on the brake actuation element or brake pedal.) If the automatic speed control system of the vehicle is requesting a target vehicle deceleration and/or a target speed of the vehicle by way of braking definition signal 12, the target brake application force $F_0$ (or the target motor force) can also be specifiable in such a way that the target vehicle deceleration and/or the target speed of the vehicle can be brought about exclusively by way of the electromechanical brake booster.

As a supplement to braking definition signal 12, further signals 14 to 18, for example an ABS flag signal 14, a brake master cylinder pressure signal 16 regarding a brake master cylinder pressure present in the brake master cylinder, and/or a brake pressure signal 18 regarding a brake pressure present in at least one wheel brake cylinder of the braking system, are also co-considered in specifying the target brake application force $F_0$ (or the target motor force). For application of control to the motor of the electromechanical brake booster in consideration at least of the braking definition signal 12, the specified target brake application force $F_0$ (or the target motor force) is co-considered upon application of control to the motor of the electromechanical brake booster. Application of control to the motor of the electromechanical brake booster is effected principally in consideration of a force difference $\Delta F$ between the specified target brake application force $F_0$ and an estimated or measured actual brake application force $F_{estimated}$ of the electromechanical brake booster into the downstream brake master cylinder (or between the specified target motor force of the motor of the electromechanical brake booster and an estimated or measured actual motor force of the electromechanical brake booster).

In the embodiment of the method which is described here, the actual brake application force $F_{estimated}$ of the electromechanical brake booster into the downstream brake master cylinder is estimated in consideration at least of a present current intensity I of a motor current of the motor of the electromechanical brake booster and of a present rotation angle φ of a rotor of the motor of the electromechanical brake booster. Values that can easily be estimated or measured can thus be used in order to estimate the actual brake application force $F_{estimated}$ of the electromechanical brake booster into the downstream brake master cylinder. (The present rotation angle φ of the rotor of the motor can be ascertained or estimated, for example, by way of a rotor position signal.) The present current intensity I of the motor current and the present rotation angle φ of the rotor of the motor of the electromechanical brake booster are furthermore values or signals that are highly dynamic. The procedure described hereinafter is thus advantageous in terms of reacting promptly to a change in a hydraulic stiffness of the braking system that interacts with the electromechanical brake booster.

Figure 1B:
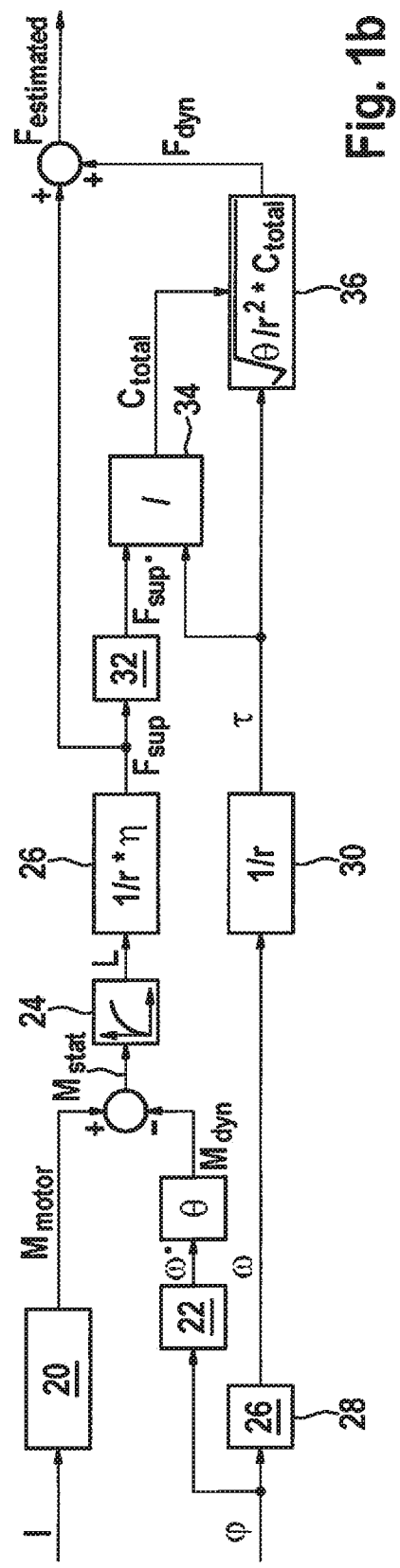

FIG. 1b schematically depicts the sub-steps for estimating the actual brake application force $F_{estimated}$ of the electromechanical brake booster into the downstream brake master cylinder. For this, a motor moment $M_{motor}$ of the motor of the electromechanical brake booster is specified in consideration at least of the present current intensity I of the motor current of the motor. Motor-specific data stored in a block 20 are considered in order to derive the motor moment $M_{motor}$ of the motor of the electromechanical brake booster from the present current intensity I of the motor current of the motor. The motor moment $M_{motor}$ of the motor of the electromechanical brake booster produces, in terms of a dynamic component $M_{dyn}$, a "motor dynamics" and, in terms of a static component $M_{stat}$, an "overriding" of a load moment or counter-moment L that the braking system opposes to the motor of the electromechanical brake booster. The dynamic component $M_{dyn}$ can be calculated as the product of a rotational acceleration ω• of the rotor of the motor of the electromechanical brake booster and an inertia θ of the motor of the electromechanical brake booster. The rotational acceleration ω• of the rotor of the motor of the electromechanical brake booster can easily be specified in consideration at least of the present rotation angle φ of the rotor of the motor. For example, the rotational acceleration ω• of the rotor of the motor is obtained from a double differentiation over time, performed in a block 22, of the present rotation angle φ of the rotor of the motor. The static component $M_{stat}$ of the motor moment $M_{motor}$ of the motor of the electromechanical brake booster is thus obtained from a difference between the motor moment $M_{motor}$ and the dynamic component $M_{dyn}$ of the motor moment $M_{motor}$. The load moment L working against the motor of the electromechanical brake booster can then be estimated in consideration of the static component $M_{stat}$ of the motor moment $M_{motor}$ of the motor of the electromechanical brake booster. For example, the static component $M_{stat}$ can be converted, using a filter stored in a block 24 and/or a (correspondingly stored) characteristic curve, into the load moment L that is working against the motor of the electromechanical brake booster.

An actual motor force or supporting force $F_{sup}$ exerted by way of the motor of the electromechanical brake booster is specified in consideration of the load moment L. For example, the gearing variable or gearing ratio r of the gearing system of the electromechanical brake booster, and an efficiency η of the electromechanical brake booster, are stored in a block 26. By way of these variables, an actual motor force or supporting force $F_{sup}$ exerted by way of the motor of the electromechanical brake booster can be derived from the load moment L. (Alternatively, the estimating method can be discontinued here, and the estimated actual motor force or supporting force $F_{sup}$ can be used to specify a force difference between the specified target motor force and the estimated actual motor force or supporting force $F_{sup}$.)

A displacement path or translation τ of a piston of the electromechanical brake booster can be specified in consideration at least of the present rotation angle φ of the rotor of the motor. For example, a rotation speed w of the rotor of the motor of the electromechanical brake booster is obtained by way of a differentiation over time, executed in a block 28, of the present rotation angle φ of the rotor of the motor. A gearing variable or gearing ratio r of a gearing system of the electromechanical brake booster is stored in a block 30, and by way of that variable or ratio the rotation speed w of the rotor of the motor is converted into the displacement path or translation τ of the piston, downstream from the gearing system, of the electromechanical brake booster. The piston downstream from the gearing system can be, for example, a valve body or a booster body of the electromechanical brake booster.

In a block 32, a differentiation over time or gradient $F_{sup}$• of the actual motor force or supporting force $F_{sup}$ exerted by way of the motor of the electromechanical brake booster is also ascertained. In a further block 34, a quotient $C_{total}$ of the differentiation over time or gradient $F_{sup}$• divided by the displacement path or translation τ of the piston of the electromechanical brake booster is calculated, indicating the change in load $C_{total}$. The change in load $C_{total}$ can also be described as a "hydraulic stiffness" of the braking system.

The change in load $C_{total}$ is outputted to a block 36 in which the inertia θ of the motor of the electromechanical brake booster and the gearing variable or gearing ratio r of the gearing system of the electromechanical brake booster are stored. It is thereby possible to calculate, from the change in load $C_{total}$, a dynamic force $F_{dyn}$ exerted by way of the electromechanical brake booster. The dynamic force $F_{dyn}$ to be exerted by way of the electromechanical brake booster can also be referred to as a "force from a kinetic energy" of the rotor of the motor of the electromechanical brake booster.

The brake application force $F_{estimated}$ of the electromechanical brake booster, with which the electromechanical brake booster applies braking into the brake master cylinder and effects or increases the brake master cylinder pressure present therein, is calculated from the sum of the actual motor force or supporting force $F_{sup}$ exerted by way of the electromechanical brake booster and the dynamic force $F_{dyn}$ exerted by way of the electromechanical brake booster. Optionally, a frictional correction (not yet outlined) for the brake application force $F_{estimated}$ can be performed.

The sub-steps described in the preceding paragraphs offer a particularly advantageous and quickly executable capability for reliably estimating the brake application force $F_{estimated}$. Be it noted also that the sub-steps depicted in FIG. 1b can be executed more quickly than a data transfer or signal transfer, via a data bus, of a measured value measured by way of at least one pressure sensor. Execution of the method described here thus allows a "prediction" of a change in the hydraulic stiffness of the braking system (as opposed to a measurement of the change in the hydraulic stiffness of the braking system). Implementability of the method is not limited, however, to the sub-steps described in the preceding paragraphs. Be it noted in particular that the sub-steps described above can also be discontinued after an estimate of the actual motor force or supporting force $F_{sup}$. In this case the method steps described below are executed by way of the specified target motor force and the estimated actual motor force or supporting force $F_{sup}$ (instead of the specified target brake application force $F_0$ and the estimated actual brake application force $F_{estimated}$).

In a method step reproduced by way of a block 38 of FIG. 1a, a target rotation speed $\omega_0$ of the motor of the electromechanical brake booster is specified in consideration of the force difference $\Delta F$ between the specified target brake application force $F_0$ and the estimated (or measured) actual brake application force $F_{estimated}$ (or between the specified target motor force and the estimated or measured actual motor force). The target rotation speed $\omega_0$ of the motor of the electromechanical brake booster may be specified, in consideration of the force difference $\Delta F$ between the specified target brake application force $F_0$ and the estimated (or measured) actual brake application force $F_{estimated}$, in such a way that an absolute value of the specified target rotation speed is always specified to be greater than or equal to a defined minimum absolute rotation speed value $\omega_{min}$ not equal to zero. This procedure takes into consideration the fact that the motor of the electromechanical brake booster "feels" the present load and/or the present change in load only as long as the motor (or its rotor) is rotating. Defining the minimum absolute rotation speed value $\omega_{min}$ (not equal to zero) thus makes it possible to ensure uninterrupted utilization of the motor of the electromechanical brake booster as a "sensor system" for ascertaining the present load and/or present change in load.

Figure 1C:
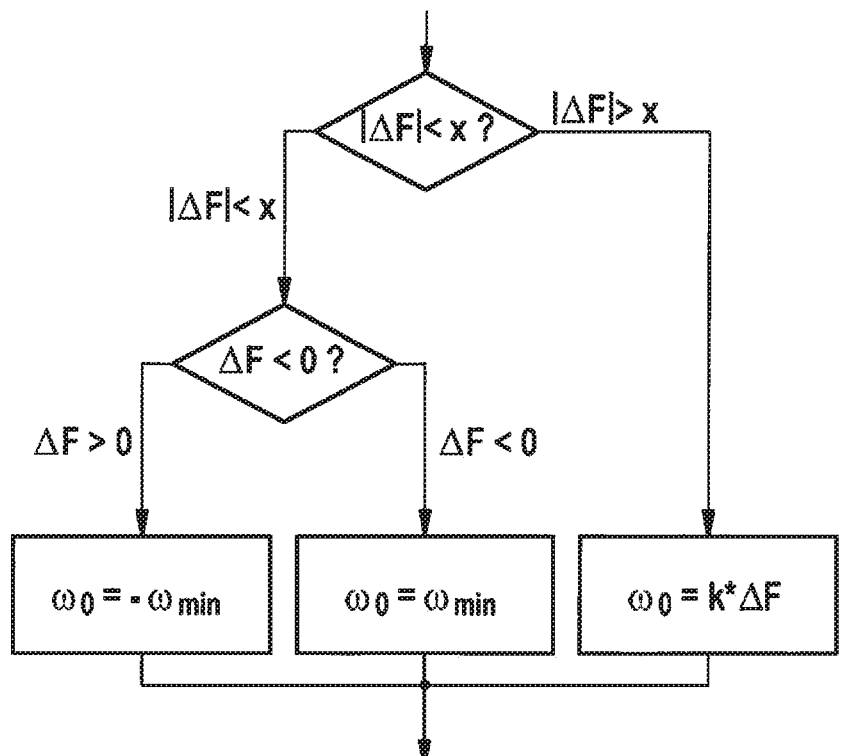

FIG. 1c shows a particularly advantageous embodiment for the method steps executed in block 38, in which firstly an absolute value of the force difference $\Delta F$ between the specified target brake application force $F_0$ and the estimated (or measured) actual brake application force $F_{estimated}$ is compared with a (pre-) defined comparison value x not equal to zero. If the absolute value of the force difference $\Delta F$ is less than the defined comparison value x, the absolute value of the target rotation speed $\omega_0$ is specified to be equal to the defined minimum absolute rotation speed value $\omega_{min}$. (For a force difference $\Delta F<0$, the target rotation speed $\omega_0$ is specified to be equal to the positive minimum absolute rotation speed value $\omega_{min}$. If, however, the force difference $\Delta F>0$, the target rotation speed $\omega_0$ is then specified to be equal to the negative minimum absolute rotation speed value $-\omega_{min}$.) If it is found, however, that the absolute value of the force difference $\Delta F$ is greater than the defined comparison value x, the absolute value of the target rotation speed $\omega_0$ is then specified as a function of the force difference $\Delta F$. It is then possible, for example, to specify the absolute value of the target rotation speed $\omega_0$ as a linear function of the force difference $\Delta F$. For example, the target rotation speed $\omega_0$ is specified to be equal to a product of the force difference $\Delta F$ times a defined gain factor k. (In principle, any control concept can be used; a P-controller is reproduced here merely by way of example.)

Figure 1D:
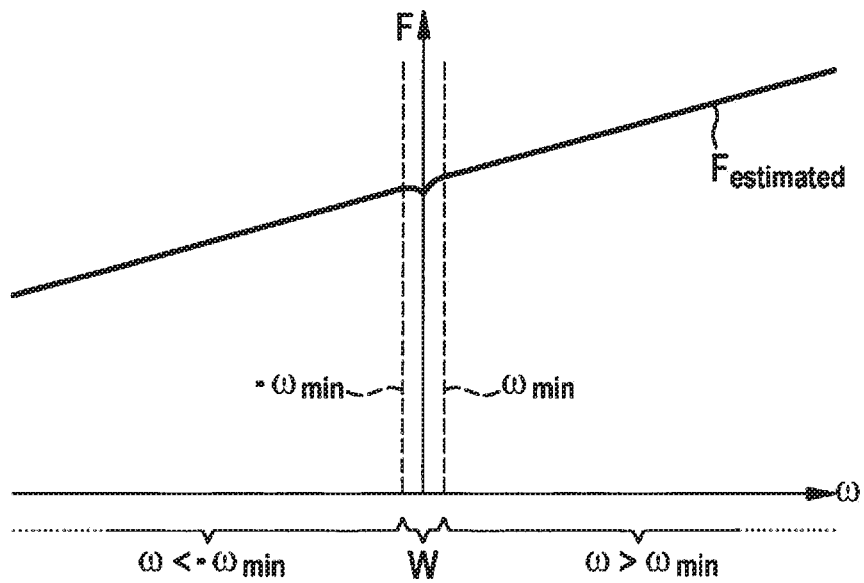

FIG. 1d shows the advantage of the procedure reproduced schematically in FIG. 1c, an abscissa of the coordinate system of FIG. 1d indicating a present rotation speed $\omega$ of a rotor of the motor of the electromechanical brake booster, and an ordinate of the coordinate system of FIG. 1d indicating a force F.

It is apparent that by way of the method step schematically depicted in FIG. 1c it is possible to ensure that the motor of the electromechanical brake booster is either in a driven mode ($\omega>\omega_{min}$) or in a driven mode ($\omega<-\omega_{min}$). Operation of the motor of the electromechanical brake booster in a rotation speed value range W of rotation speeds $\omega$ greater than the negative minimum absolute rotation speed value $-\omega_{min}$ and less than the positive minimum absolute rotation speed value $\omega_{min}$, in which reliable utilization of the electromechanical brake booster as a "sensor system" is not possible, is suppressed.

The method step depicted schematically in FIG. 1c results in almost no deviation of the at least one brake pressure in the at least one wheel brake cylinder of the braking system (from a desired target brake pressure). In particular, significant volume shifts occur during an ABS regulation operation, and they are therefore as a rule almost or entirely not apparent if control is always being applied to the motor of the electromechanical brake booster with a target rotation speed $\omega_0$ not equal to zero.

Control is applied to the motor of the electromechanical brake booster in consideration of the specified target rotation speed $\omega_0$. If a present rotation speed $\omega$ of the rotor of the motor of the electromechanical brake booster is not equal to the target rotation speed $\omega_0$ specified by way of the method step of FIG. 1c, a rotation speed difference $\Delta\omega$ between the target rotation speed $\omega_0$ and the present rotation speed $\omega$ of the rotor of the motor of the electromechanical brake booster can be specified as a controlled variable. (If the present rotation speed $\omega$ is equal to the specified target rotation speed $\omega_0$, then the minimum absolute rotation speed value $\omega_{min}$ may be specified as a controlled variable.)

The rotation speed difference $\Delta\omega$ or minimum absolute rotation speed value $\omega_{min}$ can then be converted, in a block 40, to a target current intensity $I_0$ of a target motor current of the motor. A current intensity difference $\Delta I$, constituting a controlled current variable, can then be derived from the target current intensity $I_0$ and a present current intensity I (not equal to the target current intensity $I_0$) of the motor current of the motor. (If the present current intensity I is equal to the target current intensity $I_0$, a current intensity I corresponding to the minimum absolute rotation speed value $\omega_{min}$ can also be specified as a controlled current variable.) The controlled current variable can then be used to apply further control to the motor.

In a refinement of the method described here, an "enable" signal can also be outputted from block 10 to block 38, applying control to block 38 to execute the method steps described above.

Figure 2:
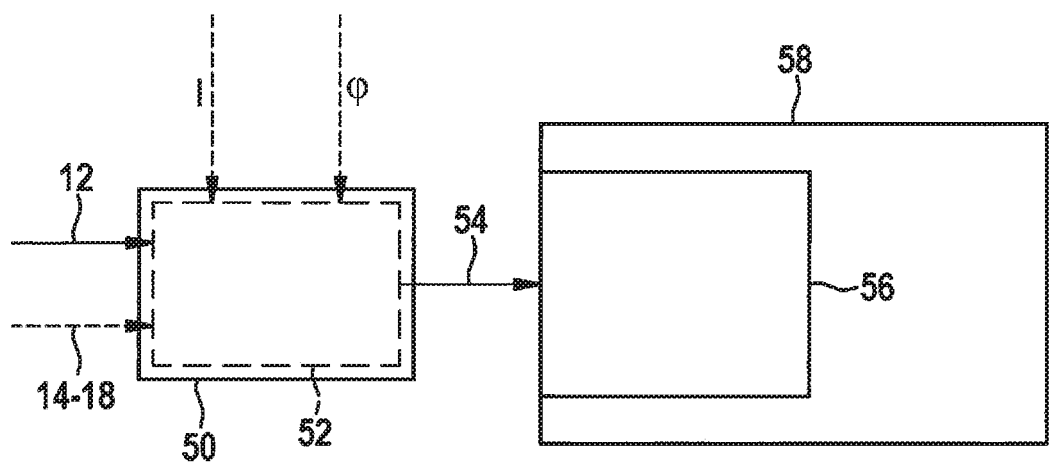
FIG. 2 schematically depicts an embodiment of the control apparatus for at least one electromechanical brake booster of a braking system of a vehicle.

FIG. 2 schematically depicts an embodiment of the control apparatus for at least one electromechanical brake booster of a braking system of a vehicle.

The usability of control apparatus 50 described below is not limited either to a specific braking system type of the braking system equipped therewith or to a specific vehicle type or motor vehicle type of the vehicle or motor vehicle fitted with the braking system. Control apparatus 50 has an electronic device 52 that is configured to output at least one control signal 54 to a motor 56 of electromechanical brake booster 58 in consideration at least of a braking definition signal 12 that relates to a braking input of a driver of the vehicle and/or of an automatic speed control system of the vehicle and is outputted to electronic device 52. Electronic device 52 is furthermore configured to specify, in consideration at least of braking definition signal 12, a target motor force of motor 56 of electromechanical brake booster 58 or a target brake application force $F_0$ of electromechanical brake booster 58 into a brake master cylinder, downstream (not depicted) from the electromechanical brake booster 58, of the braking system. Electronic device 52 is furthermore configured to output the at least one control signal 54 to motor 56 in consideration of a force difference $\Delta F$ between the specified target motor force and an estimated or measured actuator motor force $F_{sup}$ of motor 56 of electromechanical brake booster 58, or between the specified target brake application force $F_O$ and an estimated or measured actual brake application force $F_{estimated}$ of electromechanical brake booster 58 into the downstream brake master cylinder.

Operation of control apparatus 50 also makes possible very high dynamics in terms of control application to electromechanical brake booster 58. Underbraking or braking-system overloads can be ruled out with the braking system that is equipped with or interacts with control apparatus 50. In addition, control apparatus 50 can be equipped with an inexpensive electronic device 52 of comparatively simple construction. An electronic device 52 suitable for executing the method steps described above furthermore requires relatively little installation space.

In particular, electronic device can be configured to specify a target rotation speed $\omega_O$ of motor 56 of electromechanical brake booster 58 in consideration of the force difference $\Delta F$, and to output the at least one control signal 54 to motor 56 of electromechanical brake booster 58 in consideration of the specified target rotation speed $\omega_O$. Electronic device 52 may be configured to specify the target rotation speed $\omega_O$ of motor 56 of electromechanical brake booster 58, in consideration of the force difference $\Delta F$, in such a way that an absolute value of the specified target rotation speed $\omega_O$ is always greater than or equal to a defined minimum absolute rotation speed value $\omega_{min}$ that is not equal to zero. For example, electronic device 52 can be configured to specify the absolute value of the target rotation speed $\omega_O$ to be equal to the defined minimum absolute rotation speed value $\omega_{min}$ if an absolute value of the force difference $\Delta F$ is less than a defined comparison value x, and to specify the absolute value of the target rotation speed $\omega_O$ to be a (for example, linear) function of the force difference $\Delta F$ if the absolute value of the force difference $\Delta F$ is greater than the defined comparison value x. It is likewise possible, by way of electronic device 52, to estimate the actual motor force $F_{sup}$ of motor 56 of electromechanical brake booster 58 or the actual brake application force $F_{estimated}$ of electromechanical brake booster 58 into the downstream brake master cylinder in consideration at least of a present current intensity I of a motor current of motor 56 of electromechanical brake booster 58 and of a current rotation angle $\phi$ of a rotor of motor 56 of electromechanical brake booster 58. It is expressly noted that further method steps from among those described above can also be executable by way of electronic device 52.

What is claimed is:

1. A control apparatus for at least one electromechanical brake booster of a braking system of a vehicle, comprising:
   an electronic device to output at least one control signal to a motor of the electromechanical brake booster based on at least a braking definition signal, for a braking input of at least one of a driver of the vehicle and an automatic speed control system of the vehicle, outputted to the electronic device;
   wherein the electronic device is further configured to specify, based on the braking definition signal, a target motor force of the motor of the electromechanical brake booster or a target brake application force of the electromechanical brake booster into a brake master cylinder, located downstream from the electromechanical brake booster, of the braking system, and
   wherein the electronic device is further configured to output the at least one control signal to the motor based on a force difference between the specified target motor force and an estimated or measured actual motor force of the motor of the electromechanical brake booster, or between the specified target brake application force and an estimated or measured actual brake application force of the electromechanical brake booster into the downstream brake master cylinder,
   wherein the electronic device is further configured to specify a target rotation speed of the motor of the electromechanical brake booster based on-the force difference, and to output the at least one control signal to the motor of the electromechanical brake booster based on the specified target rotation speed, and
   wherein the electronic device is further configured to specify the target rotation speed of the motor of the electromechanical brake booster, based on the force difference, so that an absolute value of the specified target rotation speed is always greater than or equal to a defined minimum absolute rotation speed value not equal to zero.

2. The control apparatus of claim 1, wherein the electronic device is further configured to specify the absolute value of the target rotation speed to be equal to the defined minimum absolute rotation speed value if an absolute value of the force difference is less than a defined comparison value not equal to zero, and to specify the absolute value of the target rotation speed as a function of the force difference if the absolute value of the force difference is greater than the defined comparison value.

3. The control apparatus of claim 1, wherein the electronic device is further configured to estimate the actual motor force of the motor of the electromechanical brake booster, or the actual brake application force of the electromechanical brake booster into the downstream brake master cylinder, based on at least a present current intensity of a motor current of the motor of the electromechanical brake booster and of a present rotation angle of a rotor of the motor of the electromechanical brake booster.

4. An electromechanical brake booster for a braking system of a vehicle, comprising:
   a control apparatus for at least one electromechanical brake booster of a braking system of a vehicle, including:
   an electronic device to output at least one control signal to a motor of the electromechanical brake booster based on at least a braking definition signal, for a braking input of at least one of a driver of the vehicle and an automatic speed control system of the vehicle, outputted to the electronic device;
   wherein the electronic device is further configured to specify, based on the braking definition signal, a target motor force of the motor of the electromechanical brake booster or a target brake application force of the electromechanical brake booster into a brake master cylinder, located downstream from the electromechanical brake booster, of the braking system, and
   wherein the electronic device is further configured to output the at least one control signal to the motor based on a force difference between the specified target motor force and an estimated or measured actual motor force of the motor of the electromechanical brake booster, or between the specified target brake application force and an estimated or measured actual brake application force of the electromechanical brake booster into the downstream brake master cylinder,
   wherein the electronic device is further configured to specify a target rotation speed of the motor of the electromechanical brake booster based on-the force difference, and to output the at least one control signal to the motor of the electromechanical brake booster based on the specified target rotation speed, and wherein the electronic device is further configured to specify the target rotation speed of the motor of the electromechanical brake booster, based on the force difference, so that an absolute value of the specified target rotation speed is always greater than or equal to a defined minimum absolute rotation speed value not equal to zero.

5. A braking system for a vehicle, comprising:

a control apparatus for at least one electromechanical brake booster of a braking system of a vehicle, including:

an electronic device to output at least one control signal to a motor of the electromechanical brake booster based on at least a braking definition signal, for a braking input of at least one of a driver of the vehicle and an automatic speed control system of the vehicle, outputted to the electronic device;

wherein the electronic device is further configured to specify, based on the braking definition signal, a target motor force of the motor of the electromechanical brake booster or a target brake application force of the electromechanical brake booster into a brake master cylinder, located downstream from the electromechanical brake booster, of the braking system, and wherein the electronic device is further configured to output the at least one control signal to the motor based on a force difference between the specified target motor force and an estimated or measured actual motor force of the motor of the electromechanical brake booster, or between the specified target brake application force and an estimated or measured actual brake application force of the electromechanical brake booster into the downstream brake master cylinder;

wherein the electronic device is further configured to specify a target rotation speed of the motor of the electromechanical brake booster based on the force difference, and to output the at least one control signal to the motor of the electromechanical brake booster based on the specified target rotation speed; and wherein the electronic device is further configured to specify the target rotation speed of the motor of the electromechanical brake booster, based on the force difference, so that an absolute value of the specified target rotation speed is always greater than or equal to a defined minimum absolute rotation speed value not equal to zero;

wherein the electromechanical brake booster is controllable by the least one control signal of the control apparatus; and wherein the brake master cylinder is downstream from the electromechanical brake booster.

6. A method for operating an electromechanical brake booster of a braking system of a vehicle, the method comprising:

applying control to a motor of the electromechanical brake booster based on at least a braking definition signal for a braking input of at least one of a driver of the vehicle and an automatic speed control system of the vehicle;

specifying, based on the braking definition signal, a target motor force of the motor of the electromechanical brake booster or a target brake application force of the electromechanical brake booster into a brake master cylinder, downstream from the electromechanical brake booster, of the braking system; and applying control to the motor of the electromechanical brake booster based on a force difference between the specified target motor force and an estimated or measured actual motor force of the motor, or between the specified target brake application force and an estimated or measured actual brake application force of the electromechanical brake booster into the downstream brake master cylinder, wherein a target rotation speed of the motor of the electromechanical brake booster is specified based on the force difference, and control is applied to the motor of the electromechanical brake booster based on the specified target rotation speed, wherein the target rotation speed of the motor of the electromechanical brake booster is specified, based on the force difference, so that an absolute value of the specified target rotation speed is always greater than or equal to a defined minimum absolute rotation speed value not equal to zero.

7. The method of claim 6, wherein the absolute value of the target rotation speed is specified to be equal to the defined minimum absolute rotation speed value if an absolute value of the force difference is less than a defined comparison value not equal to zero, and the absolute value of the target rotation speed is specified as a function of the force difference if the absolute value of the force difference is greater than the defined comparison value.

8. The method of claim 6, wherein the measured actual motor force of the motor of the electromechanical brake booster, or the measured actual brake application force of the electromechanical brake booster into the downstream brake master cylinder, is estimated based on at least a present current intensity of a motor current of the motor of the electromechanical brake booster and of a present rotation angle of a rotor of the motor of the electromechanical brake booster.

* * * * *